United States Patent [19]
Haig

[11] Patent Number: 4,609,223
[45] Date of Patent: Sep. 2, 1986

[54] SUNROOF CONTROLLER

[76] Inventor: Laurence B. Haig, 841 Winslow Ct., Muskegon, Mich. 49441

[21] Appl. No.: 551,472

[22] Filed: Nov. 14, 1983

[51] Int. Cl.⁴ .................... B60J 7/053; B60J 7/185
[52] U.S. Cl. .................... 296/222; 296/224; 296/221
[58] Field of Search ............... 296/216, 221, 222, 224

[56] References Cited

U.S. PATENT DOCUMENTS

| | | | |
|---|---|---|---|
| Re. 28,346 | 2/1975 | Kouth et al. | 296/221 |
| 2,156,615 | 5/1939 | Bishop | 296/222 |
| 2,338,225 | 1/1944 | Ball | 296/222 |
| 2,661,234 | 12/1953 | Bishop | 296/224 |
| 2,774,624 | 12/1956 | Lower | 296/223 |
| 2,941,840 | 6/1960 | Golde | 296/222 |
| 3,025,099 | 3/1962 | Werner | 296/222 |
| 3,572,822 | 3/1971 | Schmid | 296/222 |
| 3,829,155 | 8/1974 | Lutz | 296/221 |
| 3,981,531 | 9/1976 | Koral et al. | 296/222 |
| 4,245,864 | 1/1981 | Shitanoki | 296/222 |
| 4,342,482 | 8/1982 | Koral et al. | 296/221 |
| 4,403,805 | 9/1983 | Strem, Jr. et al. | 296/222 |
| 4,420,184 | 12/1983 | Kaltz | 296/222 |
| 4,422,687 | 12/1983 | Kaltz et al. | 296/222 |

FOREIGN PATENT DOCUMENTS

| | | | |
|---|---|---|---|
| 59902 | 9/1954 | France | 296/222 |
| 864043 | 3/1961 | United Kingdom | 296/222 |
| 2040355 | 8/1980 | United Kingdom | 296/222 |

Primary Examiner—Robert B. Reeves
Assistant Examiner—Dennis H. Pedder
Attorney, Agent, or Firm—Price, Heneveld, Huizenga & Cooper

[57] ABSTRACT

A controller is provided for vehicle sunroofs and the like, of the type having a retractable door or closure. The controller comprises two tracks mounted in a main frame portion of the sunroof, along opposite sides of the closure. Guides project laterally outward from the sides of the closure, and are matingly received in the tracks to slidingly support the closure for fore-to-aft translation between open and closed positions. A seal is located between the closure and the frame to form a weathertight seal therebetween. The guides include cams or eccentrics that are positioned in the tracks, and are shaped so that rotation of the eccentrics raises and lowers the closure in the main frame. When the eccentrics are rotated to a locked position, the closure is raised into abutting, compressive contact with the seal to sealingly close the opening. When the eccentrics are rotated into an unlocked position, the closure is lowered out of abutting contact with the seal to permit the closure to be freely opened.

2 Claims, 19 Drawing Figures

SUNROOF CONTROLLER

BACKGROUND OF THE INVENTION

The present invention relates to sunroofs for vehicles, and the like, and in particular to a controller arrangement therefor.

Sunroofs for vehicles, and other structures, have become increasingly popular. Generally, sunroofs comprise a circumambient frame, which defines an opening or window in the structure, and a retractable door or closure to selectively close the window.

In vehicles, the sunroof is normally located in the roof of the cab, and is either of the vent type, or the slider type. Vent sunroofs have a window panel hinged to the vehicle roof along the forward edge of the window panel. The rear edge of the window panel is raised and lowered by an ajustable prop or lever to respectively open and close the sunroof. Normally, vent sunroofs are an aftermarket accessory, and are installed after the vehicle is fully assembled.

Slider sunroofs have a closure or door that retracts either partially or wholly into the roof of the vehicle between the outer metal skin of the roof and the interior headliner. Typically, slider sunroofs are original equipment accessories, and are installed when the vehicle is being assembled at the factory. Some slider sunroofs are equipped with a special mechanism, which permits the closure to be selectively pivoted in a vertical plane to also act as a vent.

Heretofore, closures for sunroofs have been controlled by either an electrical drive assembly, or a manual crank and cable arrangement. Both of these types of sunroof controllers have a rather complicated construction with multiple moving parts, and are relatively expensive to manufacture and install. The complexity of such mechanical assemblies requires periodic maintenance, and renders them inherently difficult to repair.

Also, the controllers that are designed for the slider type of sunroof have a construction which does not lend itself to aftermarket installation. Although some manually operated controllers for slider sunroofs are available, they are difficult to open and close, and encounter problems is creating a secure, weathertight seal. As a result, such structures can allow moisture to enter the vehicle, and can cause unnecessary wind noise.

SUMMARY OF THE INVENTION

One aspect of the present invention is to provide a manual controller for vehicle sunroofs, which has eccentric guides that raise and lower the closure vertically to create a secure weathertight seal in the roof. The controller includes first and second tracks mounted in the main frame along opposite sides of the closure. Guides project laterally outwardly from the opposite sides of the closure, and are matingly received in the tracks. The guides have cams, with drive shafts and eccentrics, which when rotated, raise and lower the closure with respect to the frame. A seal is positioned between the closure and the main frame, such that when the closure is in the closed position, rotation of the cams into the locked position raises the closure into abutting, compressive contact with the seal to sealingly close the opening, and rotation of the cams into the unlocked position lowers the closure out of abutting contact with the seal to permit the closure to be freely opened.

In another aspect of the present invention, the tracks include scalloped racks, which mate with the eccentrics to lock the closure in various intermediate, open positions.

In another aspect of the present invention, the forward ends of the tracks are upwardly inclined, and include pockets shaped to closely receive the eccentrics therein in a locked position. The closure cannot be opened until the eccentrics are rotated into the unlocked position.

In another aspect of the present invention, the closure includes a sliding window frame or armature, with a window panel pivotally mounted on the window frame along the forward edge thereof. In this manner, the sunroof provides both vent and slider functions.

The principal objects of the present invention are to provide an uncomplicated controller arrangement for sunroofs, which is economical to manufacture, extremely reliable, and has a neat, factory-installed appearance. Eccentric guides or cams are easily operated manually, and vertically shift the closure to create a secure, weathertight seal with the vehicle roof. Scalloped racks mate with the cams to lock the closure in any one of a large number of intermediate, open positions. The sunroof has both slider and vent functions, and can be installed in aftermarket settings. The controller has only one major moving part. The uncomplicated nature of the controller provides reliability, reduces maintenance and costs, and facilitates repair, if necessary. The sunroof is efficient in use, economical, capable of a long operating life, and particularly well adapted for the proposed use.

These and other features, advantages and objects of the present invention will be further understood and appreciated by those skilled in the art by reference to the following written specification, claims and appended drawings.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in FIGS. 2–8. However, it is to be understood that the invention may assume various alternative orientations, except where expressly specified to the contrary.

Figures 9, 10, 11, 12:
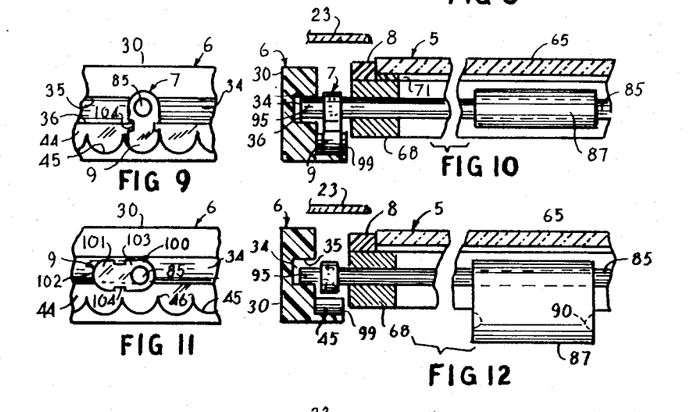
FIG. 9 is a partially schematic, fragmentary, side elevational view of the cam, with the closure, shown in a partially open and locked position.
FIG. 10 is a partially schematic, fragmentary, lateral cross-sectional view of the cam in the partially open and locked position shown in FIG. 9.
FIG. 11 is a partially schematic, fragmentary side elevational view of the cam, with the closure shown in a partially open and unlocked position.
FIG. 12 is a partially schematic, fragmentary, lateral cross-sectional view of the cam in the partially open and unlocked position shown in FIG. 11.
Figure 13:
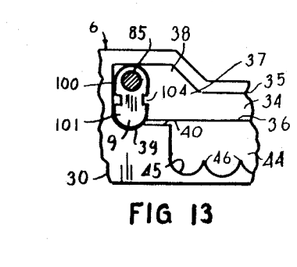
FIG. 13 is a partially schematic, fragmentary side elevational view of the cam, with the closure shown in a closed and locked position.
Figure 14:
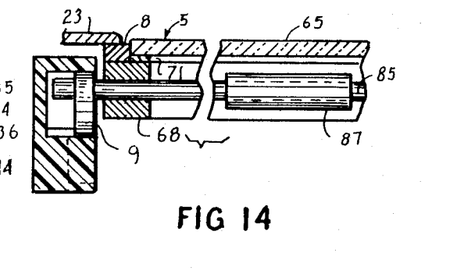
FIG. 14 is a partially schematic, fragmentary lateral cross sectional view of the cam in the closed and locked position shown in FIG. 13.

The reference numeral 1 (FIG. 1) generally designates a controller 1 for sunroofs 2. The illustrated sunroof 2 is particularly adapted for vehicles, and the like, and is of the type having a main frame 3 defining a window or opening 4 (FIG. 4), and a retractable closure 5 to selectively open and close opening 4. Controller 1 comprises left and right-hand tracks 6 (FIG. 1) mounted in main frame 3 along opposite sides of closure 5. Guides 7 project laterally outwardly from the sides of closure 5, and are matingly received in tracks 6 to slidingly support the closure for force-to-aft translation between open and closed positions. A seal 8 (FIG. 2) is positioned between closure 5 and main frame 3 to form a weathertight seal therebetween when the closure is closed. Each guide 7 (FIG. 9) includes a cam mechanism, with a drive shaft and an eccentric 9 positioned in an associated one of the tracks 6, and is shaped so that rotation of the cam eccentrics raises and lowers closure 5 in main frame 3. When cam eccentrics 9 are rotated to a first, locked position, as shown in FIGS. 13 and 14, closure 5 is raised into abutting, compressive contact with seal 8 to sealingly close the window opening 4. When cam eccentrics 9 are rotated into a second, unlocked position, as shown in FIGS. 11 and 12, closure 5 is lowered out of abutting contact with seal 8 to permit closure 5 to be opened freely.

Figure 1:
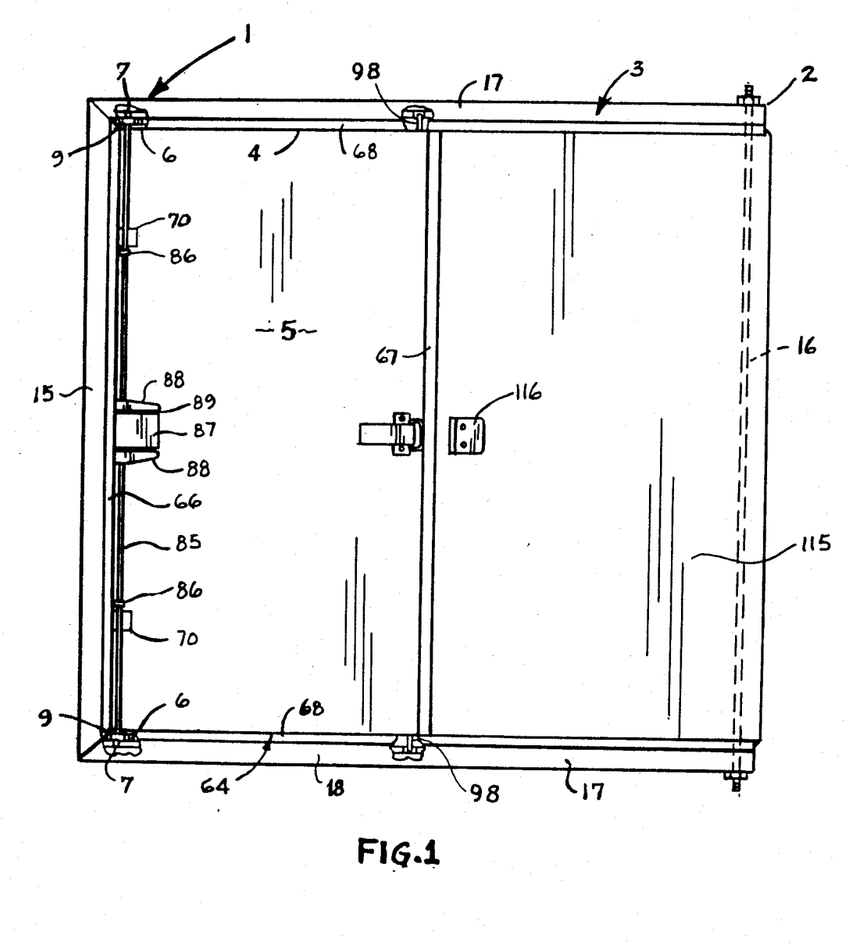
FIG. 1 is a bottom plan view of a sunroof construction, embodying the present invention, wherein portions thereof have been broken away to reveal internal construction.
Figure 3:
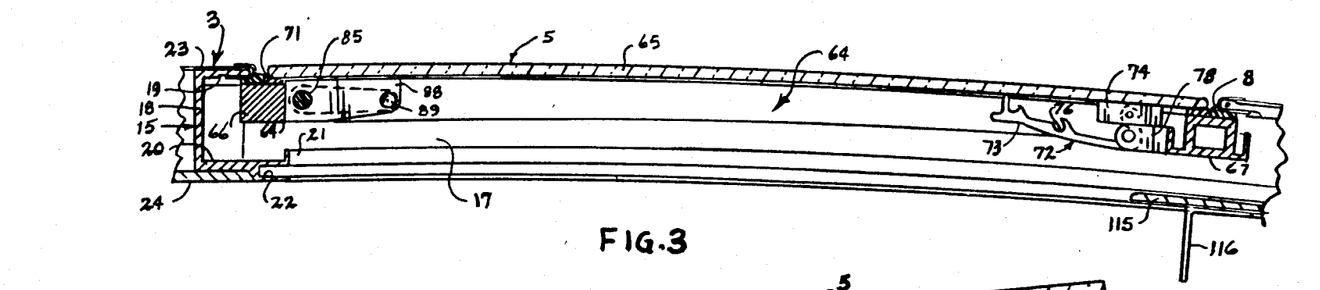
FIG. 3 is a fragmentary cross-sectional view of the sunroof, similar to FIG. 2, with the sunscreen shown in an open position.

With reference to FIG. 1, main frame 3 is a rigid structure, having a substantially rectangular plan configuration. The illustrated main frame 3 includes a front leg 15, a rear leg 16 and opposite side legs 17, which are interconnected to define interior opening 4. As best illustrated in FIG. 3, each frame leg 15–17 comprises a section of extruded, C-shaped channel, having a web 18, and upper and lower flanges 19 and 20. Lower flange 20 includes an upturned lip 21, and a U-shaped groove 22 for purposes to be described in greater detail hereinafter. When sunroof 2 is installed in a vehicle (not shown), it is adapted to fit between the outer, sheet metal skin of the roof vehicle 23, and the interior headliner 24. Main frame 3 has a length that is over twice the length of closure 5, and thereby forms a cavity in the vehicle roof into which closure 5 is retracted when opened.

With reference to FIGS. 8–17, tracks 6 are mounted on the interior faces of the main frame side legs 17. In the illustrated example, tracks 6 include a pair of forward tracks 30, and a separate pair of rearward tracks 31, which are arranged in the frame side legs 17 is an end-to-end relationship. Both pairs of tracks 30 and 31 are preferably constructed of a self-lubricating material, such as nylon, or other similar synthetic materials.

Each forward track 30 includes a longitudinally extending slot 34, defined by upper and lower surfaces 35 and 36 respectively. Slot 34 is located centrally between the vehicle roof 23 and headliner 24, and is generally parallel therewith. The forward end 37 (FIG. 13) of track slot 34 is inclined upwardly, and communicates with an enlarged pocket 38. The rearward ends 41 (FIG. 17) of track slots 34 include resilient tabs 42, which are designed to form a snap-lock with cam eccentrics 9, and retain closure 5 in the fully open position, as described in greater detail hereinafter. Tabs 42 protrude downwardly from the upper surfaces 35 of track slots 34. In this example, tabs 42 have a generally triangular configuration, and are molded integrally with tracks 30.

Each forward track 30 (FIGS. 8–14) also includes a channel 44 located on the interior face of track slot 34, and below the lower surface 36 of the track slot. The forward end of channel 44 communicates with pocket 38, and has an arcuately shaped, support pad 39 on which the cam eccentrics 9 are supported when closure 5 is locked closed. Each support pad 39 has a generally arcuate configuration, and is recessed slightly below the lower surface 36 of slot 34, as well as a leading surface, or an aft lip portion 40 of the pocket. The uppermost surface of lip 40 is located slightly below the lower surface 36 of track slot 34.

Each track channel 44 has a non-planar, scalloped base 45, which includes a plurality of side-by-side indentations or recesses 46 that are arcuately shaped to mate with cam eccentrics 9, as described below. The illustrated recesses 46 have an arcuate measure of approximately 120 degrees, and are centered vertically. The rearward end 47 (FIG. 17) of each channel 44 includes an upwardly inclined ramp 48 that leads to a generally horizontal support surface 49 on which the cam eccentrics 9 are supported when closure 5 is fully retracted. Track support surface 49 is positioned slightly below the lower surface 36 of track slot 34, so that cam eccentrics 9 are rotated into a horizontal, unlocked orientation when closure 5 is fully retracted.

The rear tracks 31 (FIGS. 15–17) also include a longitudinally extending slot 54. The forward end 55 (FIGS.

Figure 15:
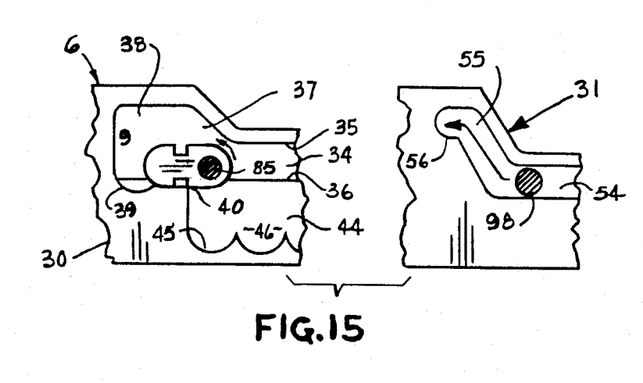
FIG. 15 is a partially schematic, fragmentary side elevational view of a track portion of the sunroof, in which the closure is in the closed position, ready to be locked.
Figure 16:
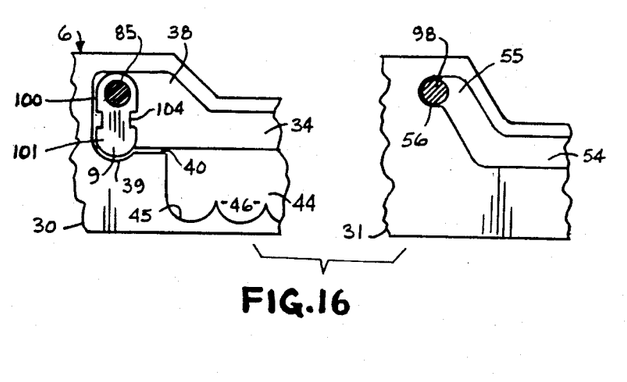
FIG. 16 is a partially schematic, fragmentary side elevational view of the track, similar to FIG. 15, wherein the cam has been rotated to the fully locked position.

15 and 16) of each slot 54 is inclined upwardly to a raised plateau 56, and has a semi-circularly shaped terminal surface. The rearward end 57 (FIG. 17) of slot 54 is generally colinear with the longitudinal axis of slot 54, and has a semi-circular terminal surface 58.

Figure 2:
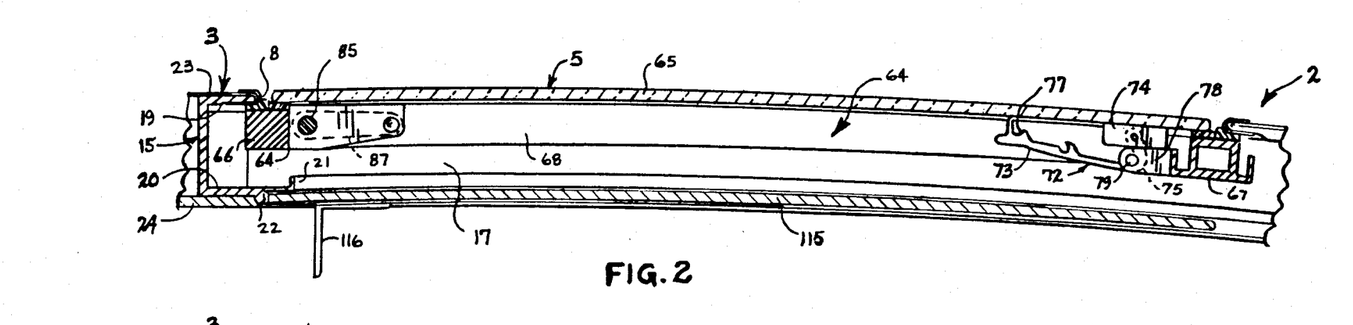
FIG. 2 is a generally longitudinal, fragmentary, cross-sectional view of the sunroof, showing a closure portion thereof in a closed and locked position, and a sun screen in a closed position.
Figure 4:
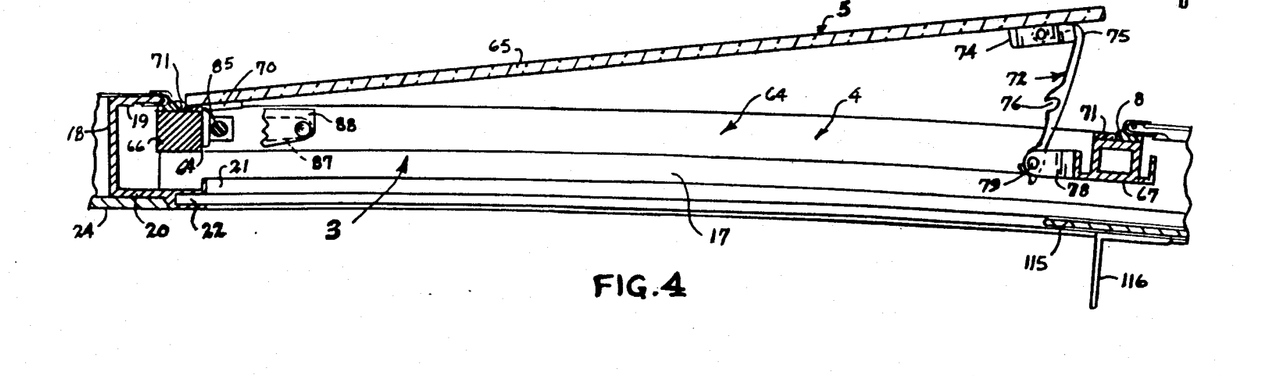
FIG. 4 is a fragmentary cross-sectional view of the sunroof, similar to FIGS. 2 and 3, with the closure shown in an upwardly pivoted, vent position.
Figure 5:
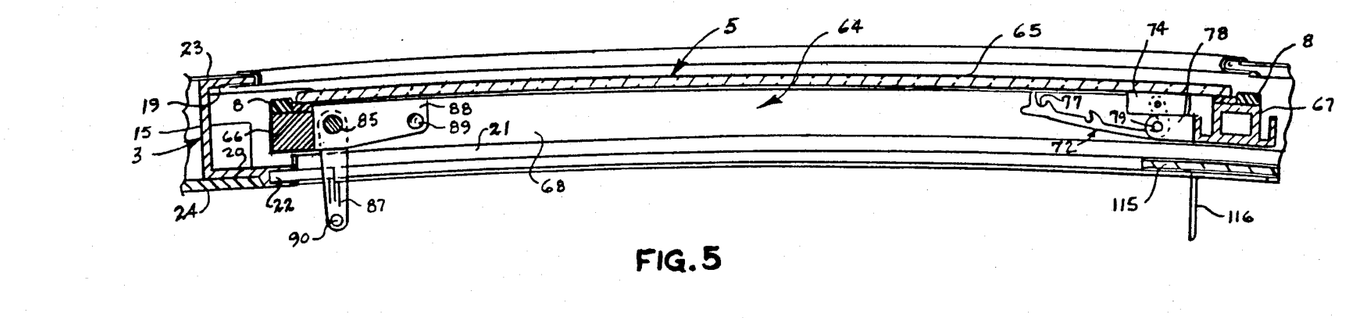
FIG. 5 is a fragmentary, cross-sectional view of the sunroof, similar to that shown in FIGS. 2-4, wherein the closure is unlocked, and closed.

With reference to FIGS. 2–4, the illustrated closure 5 comprises a rectangular armature or window frame 64 in which a transparent panel or pane 65 is pivotally mounted along its forward edge. Window frame 64 is a rigid structure, comprising a front leg 66, a rear leg 67 and opposite side legs 68. Preferably, transparent panel 65 is constructed of a very durable, shatterproof material, such as glass or plastic, and may be tinted or coated to reduce heat transfer to the cab of the vehicle. A pair of flexible, one-piece hinges 70 (FIG. 4) have opposite flanges attached to the front leg 66 of window frame 64, and the forward edge of transparent panel 65, so that the transparent panel pivots or tilts about its forward edge with respect to the window frame to provide a venting function. A seal 71 extends about the interior marginal edge of window frame 64, on the upper surface thereof, and abuts with the marginal edge of transparent panel 65 to form a weathertight seal between transparent panel 65 and window frame 64.

An adjustable prop 72 (FIGS. 2–4) is provided at the rear edge of transparent panel 65 at a laterally central portion thereof. Prop 72 includes an arm 73 having one end thereof pivotally attached to the rearward edge of transparent panel 65 by a clevis bracket 74. Arm 73 is generally L-shaped, with an arcuate elbow 75, and notches 76 and 77. A latch bracket 78 is attached to the rearward leg 67 of window frame 64, in alignment with prop arm 73, and includes a transversely extending support pin 79. When window panel 65 is pivoted upwardly for venting, it is retained in one of two selected positions by engaging either the medial notch 76 or the end notch 77 of prop arm 73 with the support pin 79 of bracket 78. It is to be understood that prop arm 73 may be provided with additional notches or other intermediate retainer mechanisms to hold window panel 65 open at additional positions.

To close window panel 65, the notched portion 76 or 77 of prop arm 73 is disengaged from support pin 79, and the prop arm is slid downwardly between support pin 79 and the rear leg 67 of window frame 64. The window panel 65 is locked sealingly in the mating window frame 64 by rotating prop arm 73 forwardly, such that the elbow portion 75 of prop arm 73 engages support pin 79, thereby forming an over-centered lock that draws the window panel down securely against seal 71.

The illustrated window frame 64 is slidingly supported in the sunroof frame 3 in the following manner. A drive control or shaft 85 (FIG. 1) is pivotally mounted on the front leg 66 of window frame 65 by a pair of nylon bearing blocks 86. In this example, control shaft 85 is a rigid, cylindrically-shaped rod. A handle-shaped lever 87 is fixedly attached to the central portion of control shaft 85, and rotates therewith. A pair of retainer brackets 88 are fixedly attached to the front leg 66 of window frame 64, and protrude rearwardly along the opposite sides of control handle 87. The free end of each retainer bracket 88 includes a hemispherically-shaped knob 89 (FIGS. 1 and 6) protruding outwardly from the interior surface thereof. Knobs 89 are constructed of a resilient, self-lubricating material, such as nylon or the like, and are preferably molded integrally with retainer brackets 88. Knobs 89 are configured to mate with a similarly shaped dimple or recess 90 in the opposite side faces of control handle 87 to form a snap-lock therebetween.

Figure 1A:
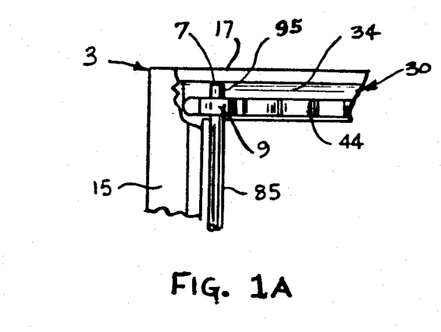
FIG. 1A is a fragmentary plan view of a forward, broken-away corner of the sunroof, particularly showing a cam with a drive shaft and an eccentric guide portion thereof.

The outer ends of control shaft 85 (FIG. 1) act as drive shafts, and extend through the side legs 68 of window frame 64 to define guides 7. The outermost, terminal free ends of control shaft 85 are, in this example, cylindrical in shape with smooth exterior surfaces that define bearing portions 95 (FIG. 1A), that are closely received in mating track slots 34. Cam eccentrics 9 are fixedly attached to the outer ends of control shaft 85, at a location thereon inwardly of the bearing portions 95. Cam eccentrics 9 are received in the channel portions 44 of tracks 30, as described in greater detail hereinafter.

Figure 1B:
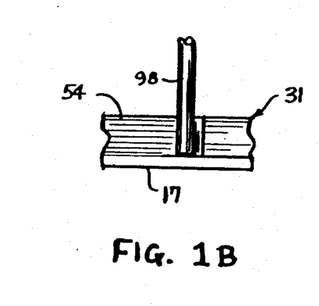
FIG. 1B is a fragmentary plan view of a rearward, broken-away portion of the sunroof, particularly showing a rear slide support arrangement.

A pair of slides 98 (FIGS. 1 and 1B) support the rearward edge of window frame 64 in sunroof frame 3. The illustrated slides 98 are cylindrically shaped pins that are rigidly attached to the side legs 68 of the window frame 64, at a location adjacent to rear frame leg 67, and protrude laterally outwardly therefrom. The outer ends of slides 98 are smooth, and closely received in the slots 54 of rear tracks 31. Hence, window frame 64 is slidingly supported in the tracks 30 and 31 by the bearing portions 95 of guides 7, at the forward edge, and slides 98 at the rearward edge, thereby providing smooth, fore-to-aft movement.

Closure 5 is retained in lateral alignment within main frame 3 by abutment between the side legs 68 (FIG. 10) of window frame 64, and the interior side faces 99 of tracks 30 and 31. Preferably, the rear leg 16 of main frame 3 comprises a rod, having its ends threadedly connected with the main frame side legs 17, such that the lateral clearance between the sides 68 of window frame 64 and tracks 30 and 31 can be adjusted to avoid binding.

With reference to FIGS. 9–15, cam or eccentrics 9 have a generally oblong shape, with oppositely oriented base and lobe portions 100 and 101. The illustrated cam eccentrics 9 have a somewhat elliptical plan shape, wherein the base and lobe portions 100 and 101 have a semi-circular, smooth marginal edge 102. The opposite side edges 103 of the cam eccentrics 9 are generally flat, with rectangular notches or indentations 104. Control shaft 85 extends concentrically through the base portions 100 of the cam eccentrics 9. The lobe portions 101 of cam eccentrics 9 are substantially commensurate in size and shape with the recesses 46 in the scalloped channel bases 45. In this example, cam eccentrics 9 are constructed from an extruded bar of aluminum.

Cam eccentrics 9 have a preselected size with respect to the space between the scalloped spaces 45 and the upper surfaces 35 of track slots 30. Initially, the space between each scalloped base 45 and the adjacent slot upper surface 35 is substantially uniform along its length. The width of each cam eccentric 9 is less than the height of the associated track space, and the length of each cam eccentric 9 is larger than the height of the associated track space, such that cam eccentric 9 can be shifted between the locked and unlocked positions, as illustrated in FIGS. 9–12.

As best illustrated in FIGS. 9–12, the diameter of the bearing portions 95 of guides 7 is slightly less than the width of the mating track slots 34 in which they are received. When closure 5 is unlocked, handle 87 points downwardly, as illustrated in FIG. 12, and cam eccentrics 9 assume a substantially horizontal orientation, with lobes 101 disposed above, and wholly disengaged from any portion of the scalloped channel bases 45. In this manner, the bearing portions 95 of the guides 7 rest on the lower surfaces 36 of slots 34, and slidingly support window frame 64 for fore-to-aft translation. To lock closure 5 in a partially open position, the operator grasps control handle 87, and rotates the same rearwardly into a substantially horizontal orientation, as shown in FIGS. 9 and 10. This motion rotates cam eccentrics 9, such that the lobe portions 101 of cam eccentrics 9 engage an associated recesses 46 in the scalloped channel bases 45, and lift window frame 64 upwardly until the bearing portions 95 of control shaft 85 abut the upper surfaces 35 of the mating tracks 30, as shown in FIGS. 9 and 10. As control handle 86 reaches the fully horizontal position, it is retained in place wtih a snap-lock action between bracket knobs 89 and handle dimples 90. With cam eccentrics 9 in the locked, substantially vertical orientation (FIGS. 9 and 10), window frame 64 cannot be moved forwardly or rearwardly unless cam eccentrics 9 are disengaged from the scalloped channel base 45 by rotating control handle 87 into the unlocked position. Cam eccentrics 9 can be oriented on control rod 85, such that they assume a forwardly overcentered, locked position in pockets 38 when handle 87 is horizontal.

Figure 17:
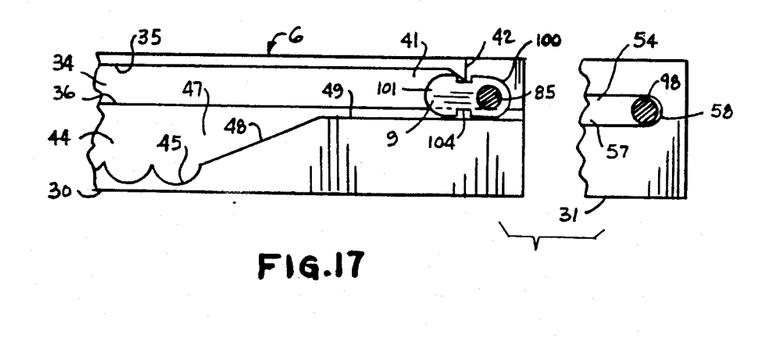
FIG. 17 is a partially schematic, fragmentary side elevational view of the track, wherein the closure is in a fully retracted, open position.

When window frame 64 is moved to the fully retracted position shown in FIG. 17, the downwardly projecting, resilient tabs 42 engage the leading edge of base portions 101 on cam eccentrics 9, and are flattened or deformed slightly until they snap into the upper notches 104 to form a lock. This snap-lock selectively retains window frame 64 in the fully retracted position.

To close the window, cam eccentrics 9 are unlocked, and window frame 64 is pulled all the way forwardly. When window frame 64 is fully forward, the marginal edges 102 of the eccentric bases 100 engage the pocket lips 40, as illustrated in FIG. 15. Control handle 87 is then rotated to the locked position, thereby pivoting cam eccentrics 9 into pockets 38, and simultaneously pulling the window frame 64 upwardly and forwardly, until cam eccentrics 9 assume a substantially vertical orientation in the mating track pockets 38, as shown in FIG. 16. This lifting action draws the forward portion of window frame 64 securely against mating seal 8. The track slots 34 have upwardly inclined forward ends which extend into pockets 38, such that when cam eccentrics 9 are rotated into the locked position (FIG. 16), the bearing portions 95 of controller shaft 85 do not engage the upper surfaces of track slots 34, thereby insuring maximum sealing contact between closure 23 and said seal 8. Pockets 38 are shaped to closely receive cam eccentrics 9 therein to positively prevent closure 23 from opening without first rotating cam eccentrics 9 out of the locked position.

As the forward edge of window frame 64 is pulled forwardly and raised into the locked postion, the rearward edge of the window frame is similarly lifted to obtain uniform compressive force on seal 8. Slides 98 engage the upwardly inclined portions 55 of the rear tracks 31. As eccentrics 9 pull window frame 64 upwardly, forwardly and engagement between slides 98 and inclined track ramps 55 lifts the rear edge of window frame 64, until each slide is resting upon the raised track plateau 56.

In the illustrated structure, sunroof 2 includes a sun screen 115 (FIGS. 2-4), slidably mounted in the lower, C-shaped slot 22 of frame 3. Sun screen 115 comprises a rigid panel of tinted or opaque material. A handle 116 is attached to and depends from a forward edge of sun screen 115 to facilitate movement. Sun screen 115 is manually translated between the closed position illustrated in FIG. 2, and the open position shown in FIG. 3.

Figures 6, 7:
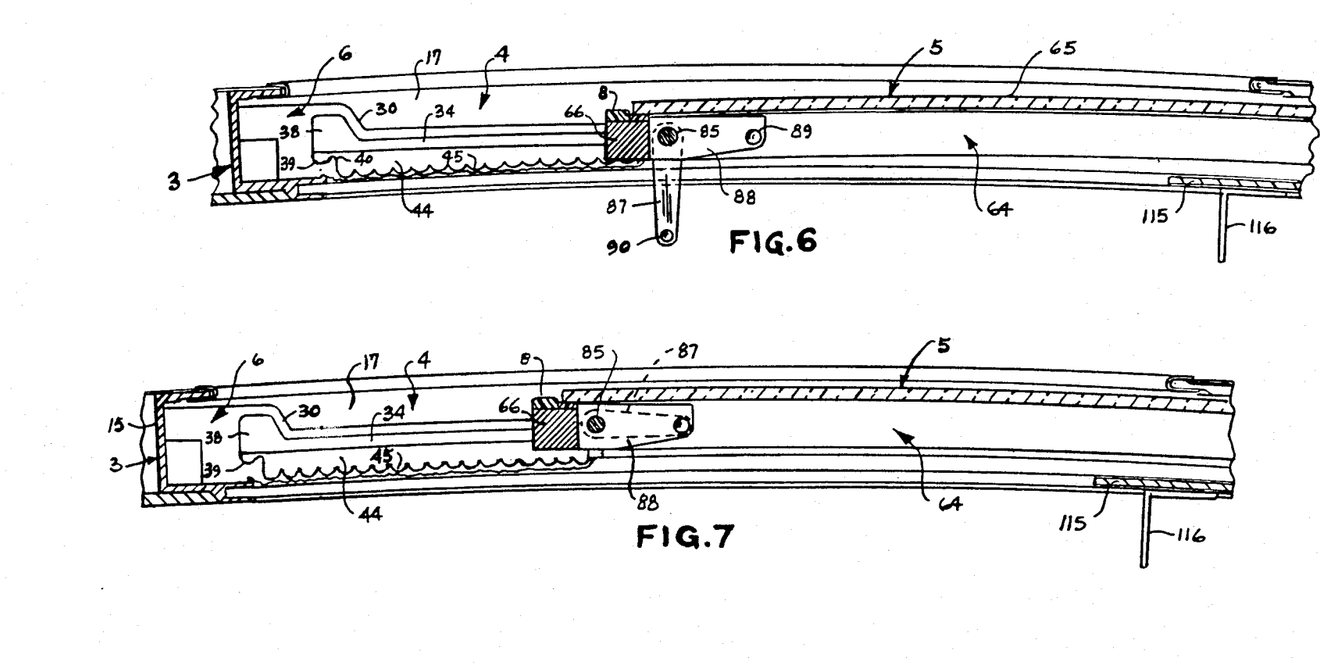
FIG. 6 is a fragmentary, cross-sectional view of the sunroof, similar to FIGS. 2-5, wherein the closure is unlocked, and is partially retracted into the top of the vehicle.
FIG. 7 is a fragmentary, cross-sectional view of the sunroof, similar to FIGS. 2-6, wherein the partially open closure has been locked in an intermediate, open position.
Figure 8:
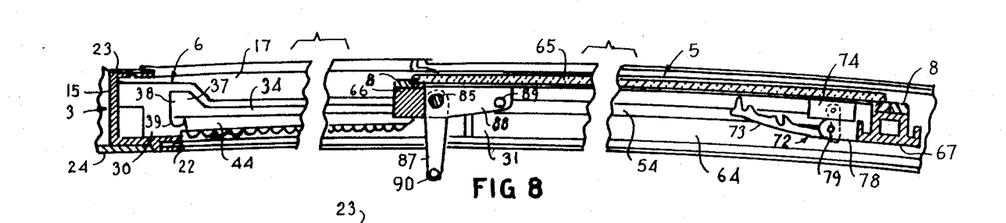
FIG. 8 is a fragmentary, cross-sectional view of the sunroof, similar to FIGS. 2–7, wherein the closure is shown in a fully retracted position.

In operation, either the driver of the vehicle, or a passenger, manually manipulates sunroof 2. Sun screen 115 is first opened by grasping handle 116, and pulling rearwardly (FIG. 2). Next, the user reaches overhead and grasps handle 87. To retract closure 5, the user pivots handle 87 downwardly (FIG. 5), and pulls the closure to the rear (FIG. 6) until the desired position is reached. If closure 5 has been fully retracted (FIG. 8), handle 87 will remain in the unlocked vertical orientation, and snap-lock tabs 42 will hold the window open. If the user has selected an intermediate open position (FIG. 6), closure 5 is locked in place by simply pivoting handle 87 upwardly into the horizontal locked position (FIG. 7). To pivot window panel 65 upwardly for venting, window frame 64 is first closed and locked. The user then grasps the free end of prop lever 73 and pulls downwardly to release the over-centered latch. Prop lever 73 is pivoted into a substantially vertical orientation, and pushed upwardly until the desired tilt position is obtained. Next, prop lever 73 is pivoted forwardly slightly to engage support pin 79 with one of the mating prop notches 76 and 77 (FIG. 4). Window panel 65 is closed (FIGS. 2 and 3) by simply reversing the steps outlined above.

The manually operated cam eccentric and guide arrangement of the present sunroof construction is a very uncomplicated construction which is economical, durable, easy to operate, and capable of forming a very secure, weathertight seal between the closure 5 and the vehicle roof 23. The two-way movement of the closure 5 is achieved with only one major moving part. The scalloped channel bases 45, when mated with the cam eccentrics 9, securely locks the closure 5 in any one of a wide variety of intermediate, open positions. The sliding window frame 64 and pivotally mounted window panel 65 arrangement provide both vent and slider functions, with a sufficiently uncomplicated construction that it can be installed in aftermarket environments, yet have a neat, factory-installed appearance.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A sunroof comprising:
  a frame defining an opening:
  a retractable closure shaped to selectively close said opening;
  means for slidingly supporting said closure in said frame for generally horizontal translation between open and closed positions;
  a releasable lock for adjustably retaining said closure in a selected, open position, including:
    at least one track positioned in one of said frame and said closure, and extending along one side thereof in the direction of generally horizontal closure translation; said track including a slot with an upper surface, and a base, and having a longitudinal axis, and a height measured between said slot upper surface and said base;

at least one cam mechanism mounted in the other of said frame and said closure at a side thereof disposed adjacent to the one side of said one of said frame and said track; said cam mechanism including a drive shaft mounted rotatably and generally transversely in the other of said frame and said closure for axial rotation therein, and an eccentric fixedly mounted on an outer portion of said drive shaft and rotating therewith; said eccentric being received in said track between the slot upper surface and said base, and having a transverse axis with a width smaller than the height of said track, and a longitudinal axis with a length larger than the height of said track;

a plurality of recesses disposed in one of said slot upper surface and said base, and shaped to mate with an associated portion of said eccentric;

means for rotating said drive shaft axially between an unlocked position wherein the longitudinal axis of said eccentric is oriented substantially parallel with the longitudinal axis of said track to permit generally horizontal translation of said closure to a selected open position, and a locked position wherein the longitudinal axis of said eccentric is oriented substantially perpendicular to the longitudinal aixs of said track, and the associated portion of said eccentric is closely received in one of the recesses in said track to positively retain said closure in the selected, open position.

2. In a vehicle sunroof of the type having a frame defining an opening and a retractable closure therefor, the improvement comprising:

first and second tracks mounted in said frame, and extending along opposite sides of said closure;

guides projecting laterally outwardly from the opposite sides of said closure, and being matingly received in said tracks to slidingly support said closure in said frame for translation between open and closed positions; said guides having first and second eccentrics respectively positioned in an associated one of said tracks, and being shaped such that rotation of said eccentrics about an associated transverse axis raises and lowers said closure with respect to said frame;

a seal positioned between said closure and said frame;

means for rotating said eccentrics about said transverse axis between locked and unlocked positions when said closure is in the closed position, whereby rotation of said eccentrics into the locked position raises said closure into abutting, compressive contact with said seal to sealingly close said opening; and rotation of said eccentrics into the unlocked position lowers said closure out of abutting contact with said seal to permit said closure to be freely moved to the open position; and wherein:

said guides include terminal, bearing portions disposed outwardly of said first and second eccentrics;

said tracks include first and second longitudinally extending slots in which said guide bearing portions are respectively received to slidingly support said closure; said track slots being defined by vertically spaced apart upper and lower surfaces;

said tracks include first and second channels in which said eccentrics are received; said track channels have scalloped bases, which include a plurality of side-by-side recesses that are shaped to mate with said eccentrics; and said eccentrics are shaped such that when said closure is open, rotation of said guides into the locked position causes abutting contact between said eccentrics and the scalloped bases of said track channels, thereby lifting the bearing portions of said guides off of the lower surfaces of said track slots, and into abutting contact with the upper surfaces of said track slots to retain said closure in the selected, open position.

* * * * *